United States Patent [19]
Torii et al.

[11] 3,872,046

[45] Mar. 18, 1975

[54] SULFONATED PHENOL (SULFO) PHTHALEIN

[75] Inventors: Saburo Torii, Tokyo; Takaaki Miyazaki; Tatsuo Aizawa, both of Osaka, all of Japan

[73] Assignee: Mita Industrial Company, Ltd., Osaka, Japan

[22] Filed: Mar. 3, 1972

[21] Appl. No.: 231,744

[30] Foreign Application Priority Data

Mar. 8, 1971 Japan.................................. 46-11812

[52] U.S. Cl. ............. 260/327 S, 260/343.4, 96/1.6, 96/1.7
[51] Int. Cl............................................. C07d 89/06
[58] Field of Search....................... 260/327 S, 343.4

[56] References Cited
UNITED STATES PATENTS
3,010,964   11/1961   Nenz et al............................. 260/290

OTHER PUBLICATIONS

Stecher et al., Ed., The Merck Index, (Merck, Rahway, N. J. 1968), page 1002.

Hykes et al., Chemical Abstracts, 65: 5302, (1966).

Jirsa et al., Chemical Abstracts, 67: 52461 d, (1967).

Klaasson et al., Chemical Abstracts, 69: 94686 c, (1968).

*Primary Examiner*—Henry R. Jiles
*Assistant Examiner*—C. M. S. Jaisle
*Attorney, Agent, or Firm*—Sherman & Shalloway

[57] ABSTRACT

Phenol (sulfo)phthalein derivatives sulfonated at the 5- and/or 5'-position, methods of preparation thereof, and the use of the derivatives as a sensitizing agent for photoconductive materials in the art of electrophotography.

8 Claims, No Drawings

SULFONATED PHENOL (SULFO) PHTHALEIN

This invention relates to a novel phenol (sulfo)phthalein derivative, and more specifically, to novel phenol(sulfo)phthalein derivatives sulfonated at the 5- and/or 5'-position, methods of preparation thereof, and the use of such derivatives as a sensitizing agent for photoconductive materials.

In the art of electrophotography, recording paper comprising a conductive base and a photosensitive layer thereon consisting of photoconductive finely divided powders and a resin binder has been well known. As the photoconductive material, inorganic materials such as $ZnO$, $CdS$, $TiO_2$, or $Al_2O_3$, and organic materials such as anthracene, vinyl carbazole, and derivatives thereof, and oxadiazole have been used. Examples of the binder resin that is used in such recording paper include silicon resin, vinyl acetate resin, acrylic resin, or a styrene-acrylic acid copolymer. It is known that these photoconductive materials have an inherent sensitivity area generally in the ultraviolet area with a wavelength below 4,000 A, and in order to enhance the sensitivity to the visible light area, it is necessary to adsorb a sensitizing agent to the finely divided powders of the photoconductive materials. A number of sensitizing dyes have already been known to be suitable as such sensitizing agents. For example, as described in detail in Japanese Pat. Publication No. 3917/58, such dyes as phthalene dyes (Fluoresceine, Eosine, Erythrocine, Rose Bengale), triphenylmethane dyes (Malachite Green, Crystal Violet, Methyl Green), cyanine dyes (cryptocyanine, pinacyanol) has been used. Of these sensitizing dyes, Rose Bengale, and Eosine (red) have especially large sensitizing effects. However, since these dyes are markedly colored themselves, they color a photosensitive layer considerably, and as a result, the background of the copy obtained is colored to an undesirable extent which seriously renders the copy indistinct.

In an attempt to remove this defect, a proposal has been made in which a mixture of sensitizing dyes having a relation of complementary color is used to prevent the photosensitive layer of the recording paper from being colored in the color inherent to the dye. The use of such a mixture of dyes having a complementary color relation causes a decrease in the lightness of the photosensitive layer, and renders the copy indistinct.

U.S. Pat. No. 3,203,795, and Japanese Pat. Publication Nos. 9543/62 and 21027/65 disclose that some of the dyes of the phenol (sulfone)phthalein series exhibit far greater sensitizing effects than Rose Bengal which has been widely used industrially as a sensitizer for photoconductive materials, which effects, however, have not yet proved fully satisfactory. As a result, there has been a strong demand for sensitizers having far superior sensitizing effects.

It has now been found that compounds having a sulfonic acid group introduced either on one or both of the 5- and 5'-position of the two phenol rings of phenolphthalein type compounds exhibit high sensitizing action photoconductive materials as compared with the known phenol(sulfo)phthalein dyes, and provide sensitizers of far superior sensitizing effects.

The novel phenol(sulfo)phthalein derivatives of this invention are expressed by the following general formula.

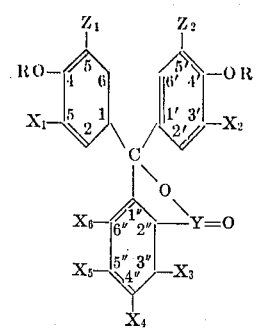

(I)

wherein R is a hydrogen atom, an alkali metal or an ammonium group, $X_1$, $X_2$, $X_3$, $X_4$, $X_5$, and $X_6$ may be the same or different and each represent a hydrogen atom, a halogen atom, an alkyl group, an alkoxy group, or a nitro group, Y is C or $\equiv$ S=O, one of $Z_1$ and $Z_2$ is a hydrogen atom, a sulfonic acid group, a sulfonate group, a halogen atom, an alkyl group, an alkoxy group, or a nitro group, and the other is a sulfonic acid group or a sulfonic acid salt group.

In the general formula (I) above, preferred halogen atoms are chlorine, bromine, and iodine. Preferred examples of the alkyl group include lower alkyl groups having not more than 4 carbon atoms such as methyl, ethyl, and isopropyl groups, and examples of the suitable alkoxy group are lower alkoxy groups with not more than 4 carbon atoms such as methoxy, ethoxy, and isopropoxy groups. $Z_1$ and $Z_2$ both can be a sulfonic acid group or a sulfonic acid salt group of the formula $SO_3M$ (M being an alkali metal or an ammonium group), or either $Z_1$ or $Z_2$ can be a sulfonic acid group or a group of the formula $SO_3M$.

The compounds of formula (I) above are light orange and red violet dyes, and have an absorption wavelength region substantially the same as that of known phenolphthalein dyes but have a greater sensitizing activity. Especially, compounds in which at least one of $X_1$, $X_2$, $X_3$, $X_4$, $X_5$ and $X_6$ is a halogen atom have an absorption wavelength region somewhat shifted to the long wavelength side, and thus produce increased sensitizing effects.

For example, the phenol(sulfo)phthalein of this invention in which the 5-and/or 5'-positions are sulfonated, in spite of having a polar group such as a sulfonic acid group, can increase the sensitizing effect expressed by the half life of light decay to 120–160% or even more as compared with Bromophenol Blue (3,3',-5,5''-tetrabromophenolsulfophthalein) or Tetrabromophenol Blue (3,3', 3'', 4'', 5,5', 5'',6''-octabromophenolsulfophthalein), which are typical known phenolsulfophthalein dyes. Moreover, this can be achieved without substantially reducing the surface potential of the photoconductive layer (photographic layer), that is, the dark decay residual rate of the charge of the photoconductive layer.

Specific examples of the compounds of general formula (I) are 3,3'-dibromo-phenolsulfophthalein-5,5'-disulfonic acid, 3,3',5-tribromo-phenolsulfophthalein-5'-sulfonic acid, 3,3',3'',4'',5'',6''-hexabromo-phenolphthalein- 5,5'-disulfonic acid, 3,3'-dimethyl-phenolsulfophthalein-5-sulfonic acid, 3,3'-dimethyl-5-bromophenolsulfophthalein-5''-sulfonic acid, 3,3'-dichloro-phenolsulfophthalein-5,5'-disulfonic acid, 3,-3-dichlorophenolsulfophthalein-5-sulfonic acid, 3,3'-dinitrophenophthalein-5,5'-disulfonic acid, 3,3'- dinitro-5-bromophenolsulfophthalein-5'-sulfonic acid, 3'',4'',5'',6''-tetrabromophenolphthalein-5,5'-disulfonic acid, 3,3'-diiodophenolsulfophthalein-5,5'-disulfonic acid, 3,3'-diiodophenolphthalein-5,5'-disulfonic acid, 3,3'-5-trichlorophenolsulfophthalein-5'-sulfonic acid, 3,3',5-trichlorophenolphthalein-5'-sulfonic acid, 3,3'-dimethyl-3'',4'',5'',6''-tetrabromophenol-phthalein-5,5'-disulfonic acid and 3,3'-dimethyl-3'',4'',5,5'',6''-pentabromophenolphthalein-5'-sulfonic acid. These compounds can be used either in the form of the free acid or in the form of alkali salts, such as sodium salts, potassium salts, or ammonium salts.

A compound of the above formula in which Y is ≡ S=O produces a better sensitizing effect than a compound of the formula in which Y is C when used as a sensitizing dye of a photoconductive material.

The novel phenol(sulfo)phthalein derivative of formula (I) can be produced for example by sulfonating a compound of the following general formula

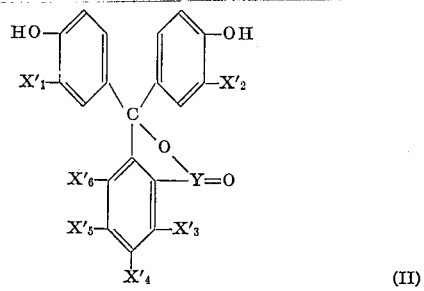

(II)

wherein $X'_1$, $X'_2$, $X'_3$, $X'_4$, $X'_5$, and $X'_6$ may be the same or different and each represent a hydrogen atom, a halogen atom, an alkyl group, an alkoxy group, or a nitro group, and Y is as defined above; in a manner known per se.

The sulfonation of the compound of formula (II) can be carried out at 100° to 180°C. using a sulfonating agent such as conc. sulfuric acid, or fuming sulfuric acid.

Where it is desired to obtain a compound of formula (I) above in which at least one of the two phenol rings of the phenol(sulfo)phthalein derivative is halogenated or nitrated, it is more convenient to halogenate or nitrate the sulfonated product obtained by the above method to introduce a halogen atom or a nitro group into the sulfonated product than to sulfonate a starting material of formula (II) in which at least one of the phenol rings is halogenated or nitrated.

If desired, the resulting product can be converted to its salt by treatment with a hydroxide or carbonate of an alkali metal such as potassium hydroxide, sodium hydroxide, or sodium carbonate, or with ammonia.

The compound of formula (II) is either known or can be readily derived from known compounds. Specific examples include phenolsulfophthalein (pheno red), phenolphthalein, 3,3'-dimethylphenolsulfophthalein (cresol red), 3,3'-dimethylphenolphthalein, 3,3'-dimethoxyphenolsulfophthalein, 3,3'-dimethoxyphenolphthalein, 3,3'-dibromophenolsulfophthalein (bromo phenol red), 3,3'-dichlorophenolsulfophthalein (chlorophenol red), and 3'',4'',5'',6''-tetrabromophenolphthalein.

The phenol(sulfo)phthalein derivatives having a sulfonic acid or sulfonic acid salt group at the 5-and/or 5'-positions of formula (I) have far superior sensitizing effects on photoconductive materials when compared with the known phenol(sulfo)phthalein derivatives.

According to another aspect of this invention, a color sensitized photoconductive material is provided for electrophotography comprising a photoconductive material and at least one compound of the formula

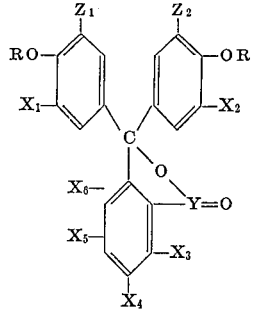

wherein R is a hydrogen atom, an alkali metal, or an ammonium group, $X_1$, $X_2$, $X_3$, $X_4$, $X_5$, and $X_6$ may be the same or different and each represent a hydrogen atom, a halogen atom, an alkyl group, an alkoxy group, or a nitro group, Y is C or ≡ S=O, one of $Z_1$ and $Z_2$ is a hydrogen atom, a sulfonic acid group, a sulfonate group, a halogen atom, an alkyl group, an alkoxy group or a nitro group, and the other is a sulfonic acid group or a sulfonic acid salt group; or its salt.

The novel sensitizing dye contained in the color sensitized photoconductive material of this invention has a light orange to red violet color in its free form, and when adsorbed to a basic photoconductive material such as ZnO, is only slightly colored. By contrast, the known Rose Bengal or Bromophenol Blue colors the photoconductive layer in a deep color.

The color sensitized photoconductive material of this invention can be prepared simply by treating the surface of a photoconducting material, preferably in the finely divided form, with the sensitizing dye of formula (I) above. For example, it can be prepared by dissolving the sensitizing dye of this invention in a polar solvent such as methanol or ethanol, adding the finely divided powders of a photoconductive material to this solution to disperse the powders uniformly, if desired removing the solvent by filtration, and then drying. This is only an example of the preparation process. When a composition coated with a photoconductive layer is desired, the photoconductive material is dispersed in a solvent capable of dissolving a resin binder, such as benzene, toluene, or xylene, and the dispersion is uniformly mixed with a solution in a polar solvent of the sensitizing dye of this invention, and preferably, a resin binder or its solvent solution is added to the mixture simultaneously.

Any materials that have photoconductive properties can be used as the photoconductive material in accordance with this invention. Examples of suitable photoconductive materials include:

1. Inorganic photoconductive materials: sulfur, selenium, oxides, sulfides and selenides of zinc, magnesium, aluminum, cadmium, titanium, mercury, antimony, bismuth, and lead, for example ZnO, MgO, $TiO_2$, $Al_2O_3$, PbO, ZnS, CdS, CdS-Se.
2. Organic photoconductive materials: Anthracene, anthraquinone, polyvinyl carbazol and its derivatives for example poly-N-vinyl-3-nitrosocarbazol, oxadiazole.

Of these, zinc oxide (ZnO) is especially preferred.

The sensitizing dye of formula (I) may be used individually, but preferably should be used in combination with a known sensitizer. Examples of such known sensitizers are red dyes such as Rose Bengale, Eosine, Erythrocine, Phloxine, and Rhodamine; blue dyes such as Methylene Blue, Alphazrine 2G, Bromophenol Blue, Brilliant Green; and Acid Brilliant Green 6B, and yellow dyes such as Acridine Orange, 2,7-dicarboxy-fluoresceine, Thioflavine, Auramine, Calcocid Yellow, and Alizarine Yellow.

The sensitizing dye of formula (1) is used in an amount of 0.5 to 60 mg, preferably 1 to 40 mg, more preferably 15 to 25 mg, per 100 g of the photoconductive material. When it is used in combination with other sensitizing dye, the amount of the sensitizing dye of this invention can be decreased.

The dye sensitized photoconductive material of this invention, by being incorporated in a photoconductive layer of a recording material for electrophotography, provides an electrophotographic recording material which gives a vivid image of high contrast with superior sensitizing effects.

The recording material can be produced by a method known per se with surface-treating the photoconducting material with the sensitizing dye of this invention. For example, it can be obtained by coating a conductive base with a resin binder solution in which the dye sensitized photoconductive material is uniformly dispersed.

The binders that are used in combination with the photoconductive material are any resin binders which bond to the substrate surface a photoconductive material such as silicon resin, acrylic resin, vinyl acetate resin, alkyd resin, or synthetic rubber. The amount of the binder is at least 0.005 parts by weight, preferably 0.1 to 0.5 part by weight, more preferably 0.15 to 0.3 part by weight, per part by weight of the photoconductive material.

The photoconductive layer coated composition mentioned above may further contain ordinary additives such as fluorescent brightening agents or static charge modifiers such as cobalt naphthenate, in addition to the dye sensitized conductors and resin binders.

Examples of the suitable base or substrate that can be used in the present invention are:

1. synthetic resin films such as polyethylene terephthalate films, polycarbonate films, polycarbonate films, polyethylene films, polypropylene films, cellulose acetate films;
2. ordinary paper sheets, and transparent or semi-transparent chemical paper sheets such as cellophane, tracing paper, resin-coated paper, or parchment paper;
3. synthetic papers such as polyethylene or polystyrene papers;
4. impregnated paper or cloth obtained by impregnating paper or cloth with one or more of copolymers of styrene, acrylic acid, butadiene or maleic acid, urea resin, melamine resin, or phenol resin;
5. synthetic resin sheets such as acrylic resin, methacrylic resin, phenol resin, melamine resin, fluorine resin, or styrene-acrylonitrile resin;
6. synthetic or natural rubber plates;
7. aluminium foils, other metal plates, metal laminate films.

When substrates having a high resistivity are used, they are treated in a known manner, for example, with water-soluble salts such as common salt, magnesium chloride, zinc chloride, or calcium hydroxide, nonvolatile alcohols such as octanol, surface active agents such as alkyl-benzenesulfonic acid, or water-soluble polymers such as polyvinyl alcohol or polyvinyl acetal to render them photoconductive (the surface resistivity is adjusted to not higher than $10^{11}$ ohms·cm, preferably not higher than $10^{10}$ ohms·cm.)

The coating of the photoconductive layer-coated composition on the substrate can be performed by any method known per se, using a doctor blade, reverse roll, air-knife coater, bar coater, sprayer, or kiss coating device. The rate of the photoconductive layer can be at least 10 g, preferably 20 to 35 g, as solids content, per square meter of the substrate.

The electrophotographic copying materials of this invention can be broadly applied to any copying method based on electrophotography. The photoconductive layer in accordance with this invention has especially superior sensitivity at a visible light region. It especially has the advantage that it has a large surface potential at the time of charging, and a reduced rate of dark decay. By using the electrophotographic copying material of this invention, copied images of good vividness and high contrast can be formed rapidly by the wet or dry developing method, and the copying operation can be performed efficiently.

EXAMPLE 1

3,3',5'-Tribromophenolsulfophthalein-5-sulfonic acid(sodium salt)

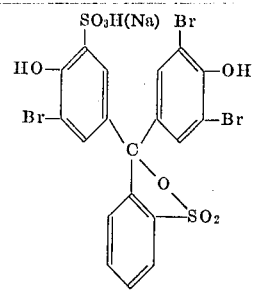

Conc. sulfuric acid (20 g) was added to 5.0 g of Phenol Red, and the mixture was heated at 150°C. with stirring until the reactants became readily soluble in water. The reaction mixture was then poured into 150 g of ice water to prepare solution A.

Solution B was prepared by dissolving 9.3 g of potassium bromide (KBr) and 2.6 g of potassium bromate ($KBrO_3$) in 70 ml. of warm water.

Solution B was gradually added to vigorously stirred solution A, and the mixture was allowed to stand for about 1 hour at room temperature with stirring. Lime milk containing 10 g of calcium hydroxide $Ca(OH)_2$ was added to the mixed solution, followed by filtration. An aqueous solution of one gram of sodium carbonate($Na_2CO_3$) in 10 g of water was added to the filtrate. The mixture was rendered neutral on weakly acidic with dilute hydrochloric acid, and evaporated to dryness using an evaporator to obtain a product having an orange color. The product was dissolved in anhydrous methyl alcohol, and the filtrate was concentrated on a water bath to produce an orange-colored purified product. The sodium salt of this product was obtained by treatment with a stoichiometric amount of an aqueous solution of sodium hydroxide, and evaporating it to dryness by means of an evaporator. The product had a melting point of 279°–280°C.

EXAMPLE 2

3,3',3'',4'',5',5'',6''-

Heptabromophenolsulfophthalein-5-sulfonic acid (sodium salt)

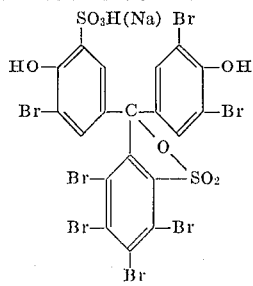

Conc. sulfuric acid (20 g) was added to 5.0 g of Tetrabromophenol Blue, and the mixture was heated at 150°C. with stirring until the reactants became readily soluble in water. The reaction mixture was then poured into 150 g of ice water to form solution A.

Solution B was prepared by dissolving 9.3 g of potassium bromide (KBr) and 2.6 g of potassium bromate (KBrO$_3$) in 70 ml. of warm water. Solution B was gradually added to vigorously stirred solution A, and the mixture was allowed to stand for about one hour at room temperature with stirring. Thereafter, the same procedure as set forth in Example 1 was repeated to produce the above compound having a melting point of at least 300°C.

EXAMPLE 3

Sodium 3,3'-dimethylphenolsulfophthalein-5,5'-disulfonate

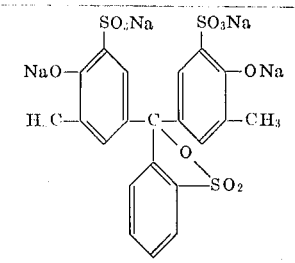

Conc. sulfuric acid (20 g) was added to 5.0 g of Cresol Red, and the mixture was heated at 150°C. with stirring until the reactants became readily soluble in water. The reaction mixture was then poured into 150 g of ice water. The resulting aqueous solution was treated in the same way as set forth in Example 1 to form a precipitate. The precipitate was filtered after dissolving in anhydrous methyl alcohol. The filtrate was concentrated on a water bath to form a reddish violet colored product. Its sodium salt was prepared by dissolving the product in a substantially stoichiometrical amount of an aqueous solution of sodium hydroxide, and evaporating it to dryness using an evaporator. The product had a melting point of at least 300°C.

EXAMPLE 4

Sodium 3,3'-dichlorophenolsulfophthalein-5,5'-disulfonate

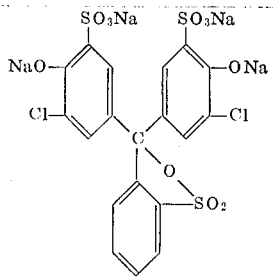

Conc. sulfuric acid (20 g) was added to 5.0 g of Chlorophenol Red, and the mixture was heated at 150°C. with stirring until the reactants became soluble readily in water. The reaction mixture was then poured into 150 g of ice water, and the aqueous solution obtained was treated in the same way as set forth in Example 1 to form a precipitate. The precipitate was dissolved in anhydrous methyl alcohol, and then filtered. The filtrate was concentrated on a water bath to produce a reddish violet colored product. Its sodium salt was obtained by treating the product with a stoichiometric amount of an aqueous solution of sodium hydroxide, and evaporating the solution to dryness using an evaporator. The product had a melting point of 255° to 258°C.

EXAMPLE 5

Sodium phenolsulfophthalein-5-sulfonate

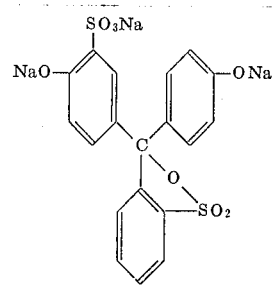

Conc. sulfuric acid (20 g) was added to 5.0 g of Phenol Red, and the mixture was heated at 150°C. until the reactants became readily soluble in water. The reaction mixture was then poured into 150 g of ice water, and treated in the same way as set forth in Example 1 above. The resulting precipitate was dissolved in anhydrous methyl alcohol, and filtered. The filtrate was concentrated on a water bath to form a red colored product. Its sodium salt was obtained by dissolving the product in a stoichiometric amount of an aqueous solution of sodium hydroxide and evaporating the solution to dryness. The product had a melting point of 223° to 230°C.

EXAMPLE 6

Sodium 3,3',5'-triiodo-3'',4'',5'',6''-tetrabromophenolphthalein-5-sulfonate

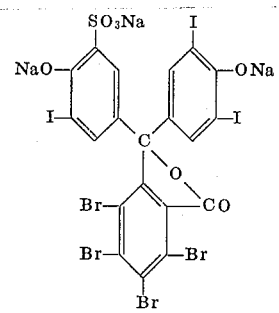

Conc. sulfuric acid (20 g) was added to 5.0 g of 3'', 4'', 5'', 6''-tetrabromophenolphthalein, and the mixture was heated at 150°C. with stirring until the reactants became readily soluble in water. The reaction mixture was then poured into 150 g of ice water. To the aqueous solution 3 g of iodine were added with vigorous stirring. The mixture was then stirred for 3 hours at room temperature. The same treatment as in Example 1 of this reaction mixture gave a precipitate which was then dissolved in anhydrous methyl alcohol, and filtered. The filtrate was concentrated on a water bath to form a yellowish orange colored product. Its sodium salt was obtained by dissolving it in a stoichiometric amount of an aqueous solution of sodium hydroxide, and then evaporating the solution of dryness using an evaporator. The product had a melting point of at least 300°C.

EXAMPLE 7

4''-Methoxy-3,3'-5'-tribromophenolsulfophthalein-5-sulfonic acid

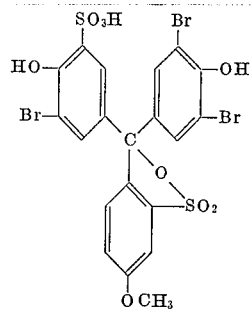

Phenol (4.0 g) was melted by heating at 110°C., and at this temperature, 4.5 g of p-methoxy-o-sulfobenzoic acid were gradually added. Furthermore, 1.0 g of zinc chloride was added. The temperature was raised to 140° to 150°C. The heating under stirring was effected until the reaction mixture became viscous. The reaction mixture was then dissolved in a dilute aqueous solution of sodium carbonate, and filtered. The filtrate was rendered neutral or weakly acidic with hydrochloric acid to form a a precipitate of a crude product. The precipitate was dried to form a crude product.

By treating 5.0 g of this crude product in the same way as set forth in Example 1, purified 4''-methoxy-3,3',5'-tribromophenolsulfophthalein-5-sulfonic acid having a melting point of 290°C. (decom.) was obtained.

EXAMPLE 8

5''-Nitro-3,3',5'-tribromophenolsulfophthalein-5-sulfonic acid

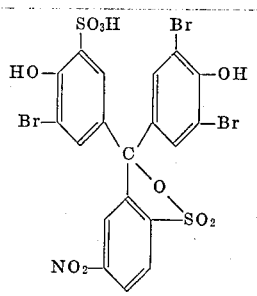

Phenol (4g) was melted at 110°C. by heating, and at this temperature, 4.5 g of 5-nitro-2-sulfobenzoic acid was gradually added. Further, 1.0 g of zinc chloride was added, and the temperature was raised to 140° to 150°C. Heating with stirring was continued until the reaction mixture became viscous. The reaction mixture was dissolved in a dilute aqueous solution of sodium carbonate, and filtered. The filtrate was rendered neutral or weakly acidic with hydrochloric acid to form a precipitate of a crude product. The precipitate was dried to form a crude product. Five grams of this crude produce were treated in the same way as set forth in Example 1 to give purified 5''-nitro-3,3'- tribromophenolsulfophthalein-5-sulfonic acid having a melting point of at least 300°C.

COMPARATIVE EXAMPLE

In order to demonstrate that the sensitizing dyes of this invention have superior sensitizing effects when compared with the known phenol(sulfo)phthalein sensitizing dyes, the following experiment was performed.

In this experiment, typical known phenolsulfophthalein sensitizing dyes, bromophenol blue and tetrabromophenol blue, and typical sensitizing dyes of this invention, 3,3',5'-tribromophenolsulfophthalein-5-sulfonic acid and 3,3',5',3'',4'',5'',6''-heptabromophenolsulfophthalein-5-sulfonic acid were used, and the photoconductive layer coated composition was prepared in accordance with the following formulations.

| Formulation | |
|---|---|
| (1) Photoconductive zinc oxide | 10 g |
| (2) Sensitizing dye * | 0.5 mg, 1.0 mg, and 2.0 mg |
| (3) Toluene (reagent grade) | 10 g |
| (4) Acrylic resin binder (50% solids content) | 4 g |

* The sensitizing dye in an amount of 50 mg was dissolved in 50 ml. of ethanol. The amount of 0.5 mg, 1.0 mg, or 2.0 mg of the sensitizing dye can be added by adding 0.5 ml., 1.0 ml., or 2.0 ml. of the ethanol solution.

Preparation and Coating

The above ingredients were added in the order of (1) to (4), and dispersed for one minite by ultrasonic vibration. The resulting dispersion was coated on the art surface of a relatively conductive art paper (volume resistivity $10^{11}$ ohms/cm), and rendered penetration proof by an organic solvent, in a thickness of about 12 microns, followed by drying. The resulting recording paper was stored for one day in a brown light-shielded box and its relative humidity adjusted to 40%. Thereafter, the following properties were measured.

Electrical measurement

Using a commercially available electrostatic photographic paper testing apparatus ("Model SP-428", Kawaguchi Denki Seisaku Sho K.K.), the initial potential ($V_1$), the residual potential $V_D$), and the half life of light decay ($E_{50}$) of the recording paper were determined at a relative humidity of 40%.

The recording paper was charged with 5 Kv of corona charge, and the paper was exposed to light by a tungsten lamp of 5 lux.

The initial potential, the residual potential, and the half life of light decay have the following meanings.

Initial potential ($V_1$): The potential on the surface of the recording paper as measured when the surface potential becomes stable in 5 seconds after charging the recording paper for 20 seconds.

Residual potential ($V_D$): The surface potential of the recording paper as measured when the recording paper has been charged for 20 seconds and then allowed to stand for 35 seconds in a dark box.

Half life of light decay ($E_{50}$): The time required from 5 seconds after charging until the ratio of (the light decay residual potential) to (the dark decay residual potential) becomes 1:2.

The term "the light decay residual potential", used here, means the surface potential of the sample measured after charging the sample for 20 seconds, exposing the sample to light after 5 seconds thereafter, for a predetermined period of time. On the other hand the term "the dark decay residual potential" means the surface potential of the sample measured after charging the sample for 20 seconds, and storing it in a dark box for a predetermined period of time.

Evaluation

The evaluation of an electrophotographic recording paper is made by comparing the dark decay residual rate ($V_D/V_I \times 100$) and the half life of light decay ($E_{50}$). The larger the value of the dark decay residual rate and the smaller the value of the half life of light decay, the higher is the quality of the electrophotographic recording paper, and the paper has a higher sensitivity and gives a more vivid copied image.

The results obtained in the present Comparative Example will be tabulated below.

produces a sensitizing effect about 20 times as much as that of a non-sensitized copying paper.

Example B

| | |
|---|---|
| Photoconductive zinc oxide | 100 g |
| Acrylic resin (solids content 50 %) | 40 g |
| Toluene | 100 g |
| Sodium 3,3',5'-tribromophenolsulfo-phthalein-5-sulfonate (added as a solution in 10 ml. of methyl alcohol) | 0.02 g |

A mixture of the above ingredients was dispersed for 5 minutes by ultrasonic vibration, and then the dispersion was coated on a relatively conductive art paper which did not permit the permeation of a solvent, in a thickness of 12 microns, followed by drying. The resulting copying paper had 1.5 times as great a sensitivity as

| SENSITIZING DYES | Amount (mg) | Initial potential (volts) ($V_I$) | Residual potential (volts)($V_D$) | Dark decay of residual rate (%)($V_D/V_I \times 100$) | Half life of light(seconds) ($E_{50}$) |
|---|---|---|---|---|---|
| Bromophenol Blue (3,5,3',5'-tetra-bromophenolsulfo-phthalein) (known dye) | 0.5 | 415 | 325 | 78.3 | — |
| | 1.0 | 450 | 340 | 75.6 | 35.5 |
| | 2.0 | 475 | 375 | 78.9 | 23.0 |
| Tetrabromophenol Blue (3,3',3'',4'' 5,5',5'',6''-octabromophenol-sulfophthalein) (known dye) | 0.5 | 460 | 335 | 72.8 | — |
| | 1.0 | 445 | 320 | 71.9 | 33.0 |
| | 2.0 | 395 | 290 | 73.4 | 20.0 |
| 3,3',5'-tribromo-phenolsulfoph-thalein-5-sulfonic acid (dye of this invention) | 0.5 | 475 | 395 | 83.1 | — |
| | 1.0 | 465 | 385 | 82.8 | 26.0 |
| | 2.0 | 450 | 365 | 81.0 | 15.5 |
| 3,3',5',3'', 4'',5'', 6''-heptabromo-phenolsulfophtha-lein-5-sulfonic acid (dye of this invention | 0.5 | 470 | 400 | 80.5 | — |
| | 1.0 | 455 | 380 | 83.5 | 24.5 |
| | 2.0 | 440 | 375 | 85.2 | 14.0 |

It is clear from the above results that in spite of the fact that the sensitizing dyes of this invention result from the replacement of the bromine atom at the 5-position of Bromophenol Blue or Tetrabromophenol Blue by a sulfonic acid group, they maintain the dark decay residual rate at a substantially high value, and have a markedly improved sensitizing effect.

Example A

| | |
|---|---|
| Photoconductive zinc oxide | 100 g |
| Vinyl acetate resin (solids content 50 %) | 40 g |
| Toluene | 100 g |
| 3,3'-dichlorophenolsulfophthalein-5,5'-disulfonic acid sodium salt (added as a solution in 10 ml. of methanol) | 0.02 g |

The mixture consisting of the above ingredients was dispersed for 50 minutes by ultrasonic vibration, and then the dispersion was coated on a relatively conductive art paper which did not permit permeation of a solvent, in a thickness of 12 microns, followed by drying. The resulting copying paper had good sensitivity, and in the case of using Bromophenol Blue as a sensitizing dye.

Example C

| | |
|---|---|
| Photoconductive zinc oxide | 100 g |
| Silicon resin (solids content 70%) | 50 g |
| Toluene | 150 g |
| Acridine Orange | 0.015 g |
| Methylene Blue | 0.01 g |
| Sodium 3,3'-dibromophenol-sulfophenolphthalein-5,5'-disulfonate | 0.015 g |

(these sensitizing dyes were added respectively as a solution in 15 ml. of methanol)

A mixture of these ingredients was dispersed for 5 minutes by ultrasonic vibration, and then the dispersion was coated on a relatively conductive art paper which did not permit the permeation of a solvent, in a thickness of 12 microns, followed by drying. The resulting copying paper had good sensitivity, and gave a vivid image on a commercially available electrophotographic copying machine (Electronic Copistar 211).

Example D

| | |
|---|---|
| Photoconductive zinc oxide | 100 g |
| Acrylic resin (solids content 50 %) | 40 g |
| Toluene | 100 g |
| Fluoresceine | 0.015 g |
| Acid Brilliant Green 6B | 0.02 g |
| Sodium 3,3'-dimethylphenolsulfophthalein-5,5'-disulfonate | 0.015 g |
| (these sensitizing dyes were added respectively as a solution in 15 ml. of methanol) | |

A mixture of the above ingredients was dispersed for 5 minutes by ultrasonic vibration, and the dispersion was coated on a relatively conductive art paper which did not permit the permeation of a solvent, in a thickness of 12 microns, followed by drying. The resulting copying paper had good sensitivity, and gave a vivid image on a commercially available electrophotographic copying machine (Electronic Copistar 211).

Example E

| | |
|---|---|
| Photoconductive zinc ozide | 100 g |
| Phenol-modified alkyd resin (solids content 50 %) | 40 g |
| Toluene | 100 g |
| 3,3'-Dichlorophenolsulfophthalein-5'-sulfonic acid (added as a solution in 10 ml. of ethyl alcohol) | 0.02 g |

A mixture of the above ingredients was dispersed for 5 minutes by ultrasonic vibration, and then the dispersion was coated on a conductive art paper which did not permit the permeation of solvent and had a volume resistivity of not more than $10^{10}$ ohms·cm, in a thickness of 12 microns, followed by drying. The resulting copying paper showed 1.6 times as great a sensitivity as in the case of using Chlorophenol Red (3,3'-dichlorophenolsulfophthalein) as a sensitizing dye.

Example F

| | |
|---|---|
| Photoconductive zinc oxide | 100 g |
| Polyester-modified acrylic resin (solids content 50 %) | 30 g |
| Silicon resin (solids content 70 %) | 7 g |
| Cobalt naphthenate (metallic content 8 %) | 1.5 mg |
| Toluene | 80 g |
| Sodium 3,3',5'-triiodo-3'',4'',5'',6''-tetrabromophenolphthalein-5-sulfonate (added as a solution in 10 ml. of methanol) | 0.02 g |

A mixture of the above ingredients was dispersed for 5 minutes by ultrasonic vibration, and then the dispersion was coated on a conductive art paper which did not permit the permeation of the solvent and had a volume resistivity of not more than $10^{10}$ ohms·cm, in a thickness of 12 microns, followed by drying. The resulting copying paper shows 1.2 times as great a sensitivity as in the case of using sodium 3,3',5,5'-tetraiodo-3'',4'',5'',6''-tetrabromophenolphthalein-5-sulfonate as a sensitizing dye.

We claim:
1. A compound of the formula

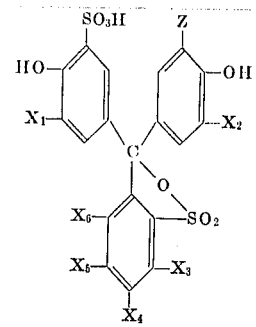

wherein $X_1$ and $X_2$ each represent a halogen atom or alkyl group having 1 to 4 carbon atoms; $X_3$, $X_4$, $X_5$ and $X_6$ each represent hydrogen atom, halogen atom, alkoxy group having 1 to 4 carbon atoms or nitro group, and Z represents a hydrogen atom, halogen atom or sulfonic acid group, or an alkali salt thereof.

2. The compound of claim 1, wherein $X_1$ and $X_2$ are bromine atoms, $X_3$, $X_4$, $X_5$ and $X_6$ are hydrogen atoms, and Z is a bromine atom.

3. The compound of claim 1, wherein $X_1$, $X_2$, $X_3$, $X_4$, $X_5$ and $X_6$ are bromine atoms, and Z is a bromine atom.

4. The compound of claim 1, wherein $X_1$ and $X_2$ are methyl groups, $X_3$, $X_4$, $X_5$ and $X_6$ are hydrogen atoms, and Z is a sulfonic acid group.

5. The compound of claim 1, wherein $X_1$ and $X_2$ are chlorine atoms, $X_3$, $X_4$, $X_5$ and $X_6$ are hydrogen atoms, and Z is a sulfonic acid group.

6. A compound of the formula

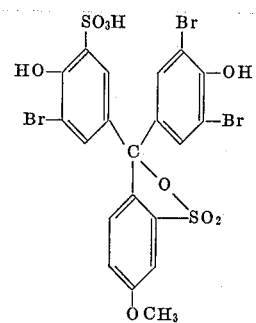

7. A compound of the formula

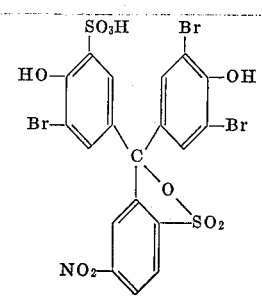

8. The compound of claim 1, wherein $X_1$ and $X_2$ are chlorine atoms, $X_3$, $X_4$, $X_5$ and $X_6$ are hydrogen atoms, and Z is a hydrogen atom.

* * * * *